(12) United States Patent
Peterson (10) Patent No.: US 9,975,590 B2
(45) Date of Patent: May 22, 2018

(54) VEHICLE TRACK

(71) Applicant: ContiTech Transportbandsysteme GmbH, Hannover (DE)

(72) Inventor: Paul John Peterson, Cuyahoga Falls, OH (US)

(73) Assignee: ContiTech Trasportbandsysteme GmbH, Hannover (DE)

( * ) Notice: Subject to any disclaimer, the term of this patent is extended or adjusted under 35 U.S.C. 154(b) by 29 days.

(21) Appl. No.: 15/139,434

(22) Filed: Apr. 27, 2016

(65) Prior Publication Data

US 2017/0313368 A1 Nov. 2, 2017

(51) Int. Cl.
*B62D 55/24* (2006.01)
(52) U.S. Cl.
CPC .................. *B62D 55/244* (2013.01)
(58) Field of Classification Search
CPC .................................................. B62D 55/244
See application file for complete search history.

(56) References Cited

U.S. PATENT DOCUMENTS

| | | | | |
|---|---|---|---|---|
| 1,400,100 | A | * | 12/1921 | Reddaway ........... B62D 55/244 305/170 |
| 2,476,460 | A | | 7/1949 | Smith |
| 3,118,709 | A | | 1/1964 | Case |
| 6,609,770 | B2 | | 8/2003 | Gauthier |
| 6,932,442 | B2 | | 8/2005 | Hori |
| 6,974,196 | B2 | | 12/2005 | Gagne |
| 7,614,706 | B2 | * | 11/2009 | Meggiolan ........... B29C 70/446 301/95.102 |
| 7,784,884 | B2 | | 8/2010 | Soucy et al. |
| 7,914,090 | B2 | | 3/2011 | Soucy et al. |
| 8,567,876 | B2 | * | 10/2013 | Wellman ............. B62D 55/244 305/166 |
| 9,457,851 | B2 | * | 10/2016 | Delisle .................. B62D 55/24 |
| 2003/0015918 | A1 | * | 1/2003 | Hori .................... B62D 55/244 305/179 |
| 2004/0222697 | A1 | | 11/2004 | Soucy |
| 2007/0126286 | A1 | | 6/2007 | Feldmann |
| 2008/0100134 | A1 | | 5/2008 | Soucy |
| 2008/0136255 | A1 | | 6/2008 | Feldmann et al. |

FOREIGN PATENT DOCUMENTS

| | | |
|---|---|---|
| AU | 2006241315 A1 | 6/2007 |
| CA | 2412182 A1 | 5/2004 |
| EP | 1176087 A1 | 1/2002 |
| WO | 1991007306 A1 | 5/1991 |
| WO | 2004083024 A1 | 9/2004 |

OTHER PUBLICATIONS

International Search Report dated Aug. 24, 2017 of international application PCT/EP2017/059361 claiming Priority this application.

* cited by examiner

*Primary Examiner* — Kip T Kotter
(74) *Attorney, Agent, or Firm* — David L. Cate (57) ABSTRACT

A track includes a body formed of an elastomeric material having a series of longitudinally spaced guide-drive lugs, as well as a base and an outer surface disposed upon the upper face of each of the guide-drive lugs. At least one multilayer reinforcement is disposed within each of the guide-drive lugs at a distance inward from the outer surface, where the multilayer reinforcement is a contiguous roll providing a plurality of 360-degree turns of reinforcement material, and the roll has an axial cross-sectional shape selected from one of circular, rectangular, square, ovate and trapezoidal.

16 Claims, 7 Drawing Sheets

VEHICLE TRACK

FIELD

The field to which the disclosure generally relates is vehicle tracks, and more particularly to vehicle tracks having guide-drive lugs with reinforcement layers.

BACKGROUND

This section provides background information to facilitate a better understanding of the various aspects of the disclosure. It should be understood that the statements in this section of this document are to be read in this light, and not as admissions of prior art.

Positive guide-drive, endless rubber tracks such as those used on agricultural or industrial vehicles typically have an internal, center row of individual guide-drive lugs which engage guide-drive bars on a guide-drive wheel. The continued use and contact between the guide-drive bar and guide-drive lugs cause internal lug stresses and surface wear at the points of contact. Additionally, the internal, center row of lugs are typically functioning not only to transmit power from the guide-drive wheel to the track, but also to retain the track on the vehicle. Contact between the vehicle undercarriage wheels and lateral end of the guide surfaces of the inner lugs frequently occurs as the vehicle maneuvers during normal service. This contact can cause wearing of the inner lugs, which can be severe, depending upon various vehicle design features and application use. Driving and/or guiding forces on the inner lugs, henceforth referred to also as guide-drive lugs, can lead to cracks and eventual chunking of the rubber surface, and possibly to complete removal of the guide-drive lugs, making the track unserviceable. Thus, a track belt having guide-drive lugs which are stronger and more resistant to wear is desired.

United States Patent Publication No. 2008/0136255 A1 discloses an endless track belt for use in an industrial or agricultural vehicle. The endless rubber track belts described therein include a rubber carcass having an inner surface having one or more guide-drive lugs and an outer surface having tread lugs. The guide-drive lugs include reinforcement layers that partially or substantially cover all or a portion of the end faces of the guide-drive lugs. The reinforcement layers may include continuous strips, or discrete strips. The reinforcement layer may also be fabric cut outs to match the shape of the guide-drive end faces of the guide-drive lugs.

U.S. Pat. No. 6,974,196 B2 describes an endless track for an industrial or agricultural vehicle consisting of a body formed of a rubber material having an outer surface displaying a series of ground engaging profiles longitudinally spaced along the surface and an inner surface displaying a series of longitudinally spaced guide-drive lugs adapted to be engaged by guide-drive sprockets on the vehicle driving assembly. The body of the endless track is fabric reinforced. One layer of fabric longitudinally extends at a distance from the inner surface of the track and has a width slightly less than the width of the guide-drive lugs so that the fabric may extend inside the guide-drive lugs to increase their rigidity.

U.S. Pat. No. 8,567,876 B2 discloses a concept for a fabric reinforced rubber track guide-drive lug that provides a guide-drive lug which incorporates a fabric on or close to the surface of the lug to provide reinforcement. However, in some conditions, this surface reinforcement is often substantially abraded in service by contact with the wheels of the tracked vehicle and consequently does not last through the potential life of the track.

Thus, there is an ongoing need for endless tracks for industrial or agricultural vehicles with improved guide-drive lugs that extend the useable life of the track in conditions where guide-drive lug wear or damage are the primary life limiting conditions, such need met, at least in part, with embodiments according to the following disclosure.

SUMMARY

This section provides a general summary of the disclosure, and is not a necessarily a comprehensive disclosure of its full scope or all of its features.

In a first aspect of the disclosure, an endless vehicle track is provided which includes a body formed of an elastomeric material having an outer surface displaying a series of ground engaging profiles longitudinally spaced along the outer surface and an inner surface displaying a series of longitudinally spaced guide-drive lugs for retaining the track on the vehicle and/or driving the vehicle. A base and an outer surface is disposed upon the upper face of each of the guide-drive lugs, and a given width and height defined by each of the guide-drive lugs. At least one multilayer reinforcement is disposed within each of the guide-drive lugs at a distance inward from the outer surface, and the multilayer reinforcement is a contiguous length that provides a plurality of layers of reinforcement material within each guide-drive lug. In some aspects, the multilayer reinforcement has a transverse width that is less than or equal to the width of the guide-drive lugs. Also, the multilayer reinforcement may extend into the lugs from essentially the base of the lugs. An outer fabric reinforcement layer may extend over the lugs at or near the surface of at least one guide-drive face of the lugs, and in some cases, may further extend over the lugs at or near the surface of at least a portion of the upper face of the lugs. Also, the reinforcing material forming the multilayer reinforcement is, in some cases, entrained within a matrix material.

In some embodiments of the disclosure, the multilayer reinforcement is a contiguous roll providing at least one 360-degree turn of reinforcement material within each guide-drive lug. In some cases, a plurality of 360-degree turns of reinforcement material is used. In some aspects, a plurality of multilayer reinforcements is embedded in each of the guide-drive lugs.

In some aspects, the multilayer reinforcement is a roll having an axial cross-sectional shape selected from one of circular, rectangular, square, ovate and trapezoidal, and the axis of the shape may be orientated transverse to longitudinal direction of the outer surface of the body, or alternatively, orientated parallel to longitudinal direction of the outer surface of the body.

In another aspect of the disclosure, a track includes a body formed of an elastomeric material having a series of longitudinally spaced guide-drive lugs, as well as a base and an outer surface disposed upon the upper face of each of the guide-drive lugs. At least one multilayer reinforcement is disposed within each of the guide-drive lugs at a distance inward from the outer surface, where the multilayer reinforcement is a contiguous roll providing a plurality of 360-degree turns of reinforcement material, and the roll has an axial cross-sectional shape selected from one of circular, rectangular, square, ovate and trapezoidal.

Yet another aspect provides track including a body formed of an elastomeric material having a series of longitudinally spaced guide-drive lugs, a base and an outer surface disposed upon the upper face of each of the guide-drive lugs, and at least one multilayer reinforcement disposed within each of the guide-drive lugs at a distance inward from the outer surface, where the multilayer reinforcement is a contiguous roll providing at least one 360-degree turn of reinforcement material, and the roll defines an axial cross-sectional shape. The axis of the shape may be orientated transverse to longitudinal direction of the outer surface of the body, or orientated parallel to longitudinal direction of the outer surface of the body.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a range or dimension listed or described as being useful, suitable, or the like, is intended that any and every value or dimension within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Figure 1:
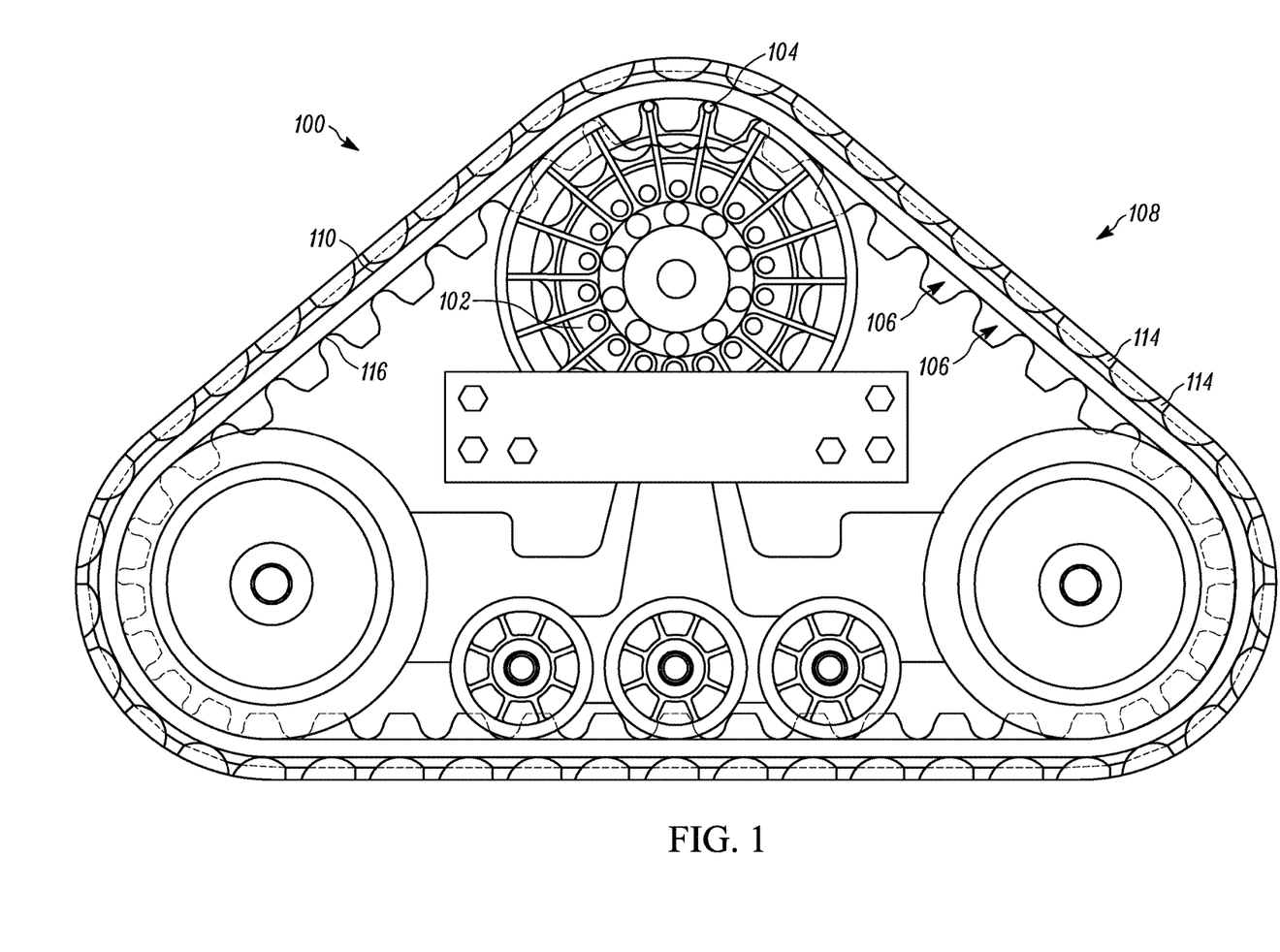
FIG. 1 illustrates a track assembly which may be used on an industrial or agricultural vehicle, according to an embodiment of the disclosure.

FIG. 1 illustrates a track assembly 100 which may be used on an industrial or agricultural vehicle (not shown). The track assembly 100 includes a guide-drive wheel 102 comprising a plurality of teeth or guide-drive bars 104 that are positioned for mating engagement with guide-drive lugs 106. The guide-drive lugs 106 are mounted on a rubber track 108 having an endless elongate carcass defining a longitudinal direction around the circumference thereof. The endless track carcass has an outer surface 110 including a plurality of ground engaging tread lugs 114 and an inner surface 116 with a plurality of guide-drive lugs 106, typically located on or near the center portion of the carcass.

Figure 2:
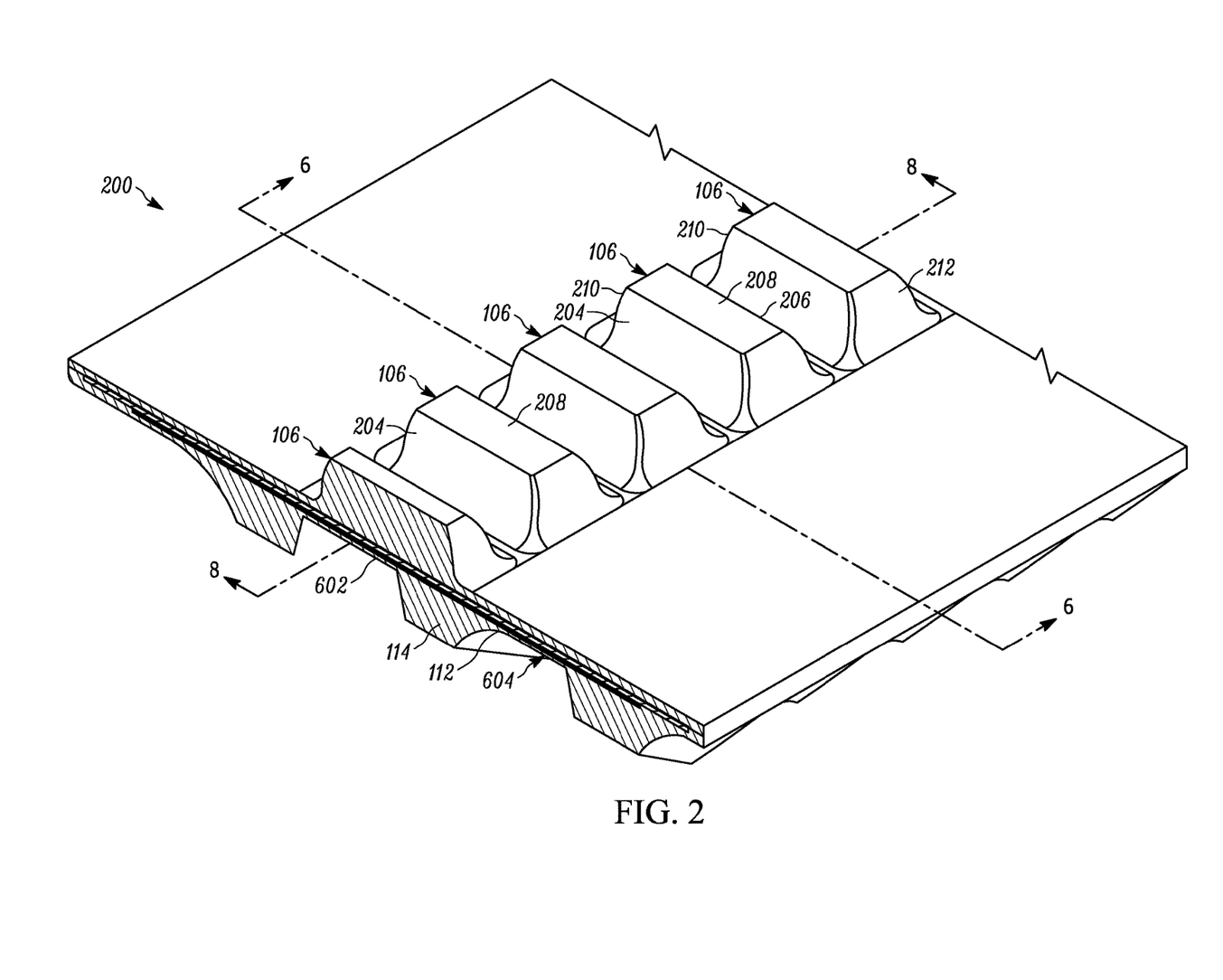
FIG. 2 depicts, in a perspective view, a portion of a track where guide-drive lugs both retain the track on the vehicle and are engaged and driven by a guide-drive wheel in accordance with an embodiment of the disclosure.

FIG. 2 illustrates one embodiment according to the disclosure where guide-drive lugs both retain the track on the vehicle and are engaged by the guide-drive wheel to transfer power to the track. In another embodiment of the disclosure, the guide-drive lugs are only provided for the purpose of retaining the track on the vehicle. In this scenario, the guide-drive lug only act in the capacity of guide-lugs. In cases where the lugs act to both guide and guide-drive the track, each guide-drive lug 106 comprises an elongated shaped bar with inclined guide-drive faces 204, 206, and an upper flat face 208. The inclined faces are typically known as the guide-drive face 204 and the reverse face 206 of the guide-drive lugs 106. End or guiding faces 210, 212 may be flat or in the alternative they can have various other suitable shapes, such as tapered, convex, concave, and the like.

Figure 3:
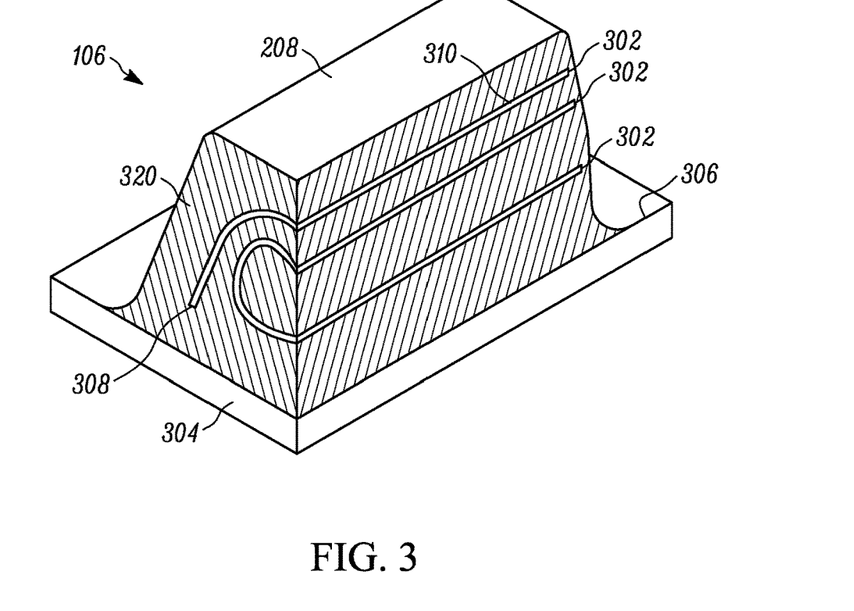
FIGS. 3 and 4 are fragmented perspective views of multilayer reinforcements embedded within guide-drive lugs, in accordance with embodiments of the disclosure.

Now referring to FIG. 3 which shows a multilayer reinforcement 302 embedded within a guide-drive lug 106 where the multilayer reinforcement 302 is disposed within the guide-drive lugs 106 at a distance inward from the outer surface (flat face 208 of the guide-drive lugs 106), and where the inner multilayer reinforcement 302 begins at a first point within the lugs and end at a second point within the lugs without extending into the carcass 304 of the track. As can be seen, the multilayer reinforcement 302 does not extend continuously between different lugs of the track, but rather contained within the lug 106. It should also be noted that the multilayer reinforcement is provided in a contiguous length repeatedly layered upon itself (three layers shown), as depicted and described in further detail below, and has width that is narrower than or equal to the corresponding parallel outer dimension of guide-drive lugs 106 within which it is disposed. In some embodiments according to the disclosure, multilayer reinforcement 302 extends into the lugs 106 from a point at or close to the base 306 of the lugs (as shown in FIG. 3) where the lugs are affixed to the carcass 304 of the track. In one embodiment of the disclosure the multilayer reinforcement extends into the lugs from point 308 that is any suitable distance, such as at least 0.05 inch, 0.08 inch, 0.10 inch, or even 0.125 inch from the base 306 of the lugs 106. It is typical for the multilayer reinforcement 302 to extend into the lugs 106 from an end point 308 that is at least 0.125 inch or even at least 0.25 inches from the base 306 of the lugs 106. The outermost layer 310 of multilayer reinforcement 302 will typically also be embedded within the lugs 106 at a distance of at least from about 0.05 inch to about 0.125 inch from the upper flat face 208 (outer surface) of the lugs 106. In some aspects, the multilayer reinforcement 302 will be embedded within the lugs 106 at a distance of at least about 0.25 inch from the upper flat face 208 (outer surface) of the lugs. In most cases the multilayer reinforcement 302 will be embedded totally within the lugs without extending beyond the base 306 of the lugs 106 and certainly without extending into the carcass 304 of the track.

Figure 4:
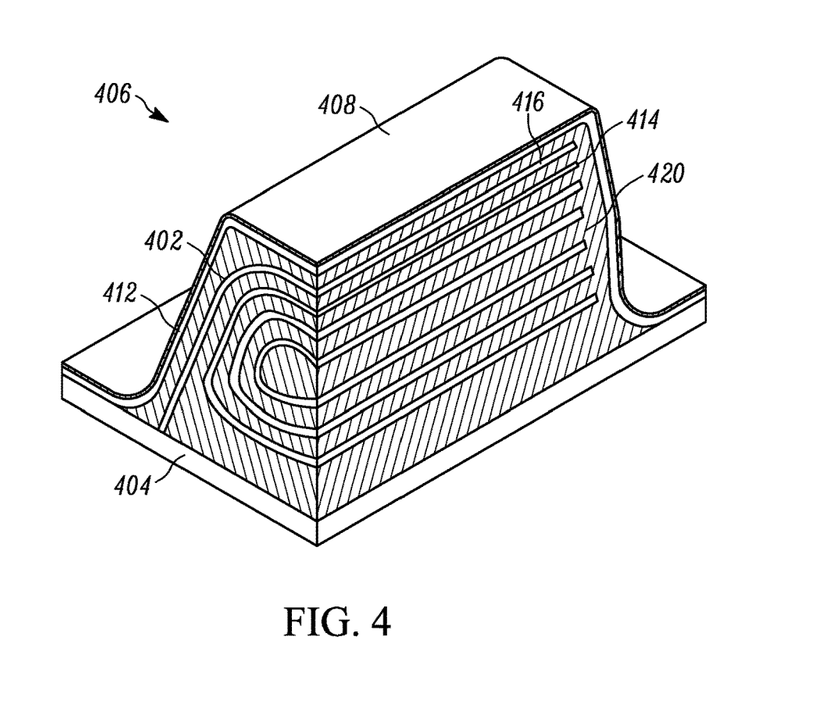

FIG. 4 illustrates another embodiment of the disclosure where multilayer reinforcement 402 is a contiguous sheet orientated in parallel layers disposed relative one another, with seven layers of the reinforcing material included within each guide-drive lug 406. The outermost layer of multilayer reinforcement 402 extends into the guide-drive lugs to a distance inward from the outer surface (upper flat face 408 of the guide-drive lugs 406), where the layers begin at a first point within the lugs and end at a second point within the lugs without extending into the carcass 404 of the track. In the embodiment illustrated in FIG. 4, as may be the case with any embodiments according to the disclosure, an outer (external) reinforcement layer 412, separate from multilayer reinforcement 402, may be disposed proximate, or onto, the outer surface of the guide-drive lugs 406. In the embodiment depicted, both of multilayer reinforcement 402 and reinforcement layer 412 are embedded within the lugs 406 without extending into the carcass 404 of the track. The second layer 414 of multilayer reinforcement 402 may, in some aspects, be embedded at least 0.125 inch deeper into the guide-drive lugs 406 than the outermost layer 416. In some cases, second layer 414 will be embedded at least 0.25 inch deeper into the guide-drive lugs 406 from the upper face 408 of the guide-drive lugs 406 than the outermost layer 416. Further layers contained in the contiguous multilayer reinforcements 402 may typically be embedded into the lugs at a distance of at least about 0.125 inches, or at least about 0.25 inches apart (deeper into the lug that the next multilayer reinforcement). Tracks according to the disclosure may contain any suitable number of layers formed from a contiguous sheet to provide a multilayer reinforcement 402, for example from 2 to 20 layers, or any integer within the range.

Referring again to both FIGS. 3 and 4, multilayer reinforcement 302, 402, is shown disposed within lugs 106, 406, which have a material matrix 320, 420, within which multilayer reinforcements 302, 402, are contained. The material forming matrix 320, 420, may be any suitable material readily know to those of skill in the art, for example, but not limited to, natural rubber or synthetic rubber, such as emulsion styrene-butadiene rubber, solution styrene-butadiene rubber, synthetic polyisoprene rubber, polybutadiene rubber, or a blend of natural and synthetic rubbers, and the like. Also, the belt carcass 304, 404, typically includes one or more layers of natural rubber, synthetic rubber, elastomeric material, or any other suitable material know to those of skill in the art.

Multilayer reinforcement 302, 402, may be made up of a strength reinforcing material such as formed plate, a foil, a matrix of cords, rods, fibers, twisted fibers, or wires, or even a fabric sheet. In some aspects, useful high-modulus strength reinforcing materials include fibers, cords or fabric produced from aramid, fiberglass, nylon, polyester, cotton, steel, carbon fiber, acrylic, polyketone, hemp, jute, carbon fiber and polybenzoxazolepolyethylene naphthalate (PEN), segmented polyurethane, poly(p-phenylene-2,6-benzobisoxazole) (PBO), basalt, boron, or liquid crystal polymer (LCP). In some aspects, cords may be a twisted filament yarn, or a twisted bundle of yarns of continuous carbon fiber filaments. Notwithstanding the material, or material structure used, the multilayer reinforcement is typically provided in a preformed roll, or similar structure, having the desired number of layers orientated in a contiguous length. The preformed roll may be obtained, in some cases, by rolling a sheet of reinforcing material into a structure having layers orientated in a contiguous length, and then cutting the roll to a suitable width and shape. Also, in some aspects, the strength reinforcing material may be entrained within a matrix prior to forming the roll, and the material forming the matrix may be any other those materials described above, or any other suitable material. When integrated into the multilayer reinforcement, the matrix material selected to provides sufficient adhesion through chemical and/or mechanical bonding with material matrix 320, 420, in the manufacture of the track and during the useful life thereof, and without delamination of the lug at the interface of the strength reinforcing material and material matrix.

Figure 5A:
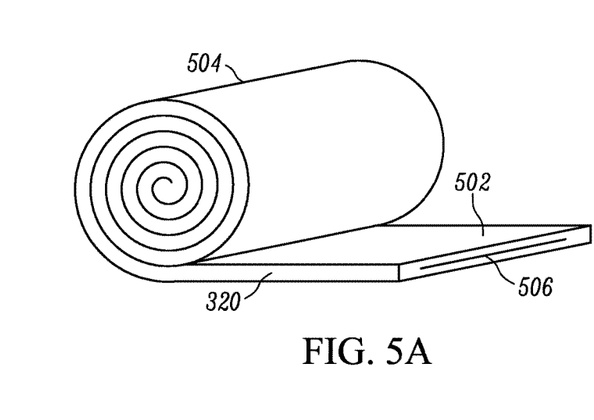
FIGS. 5A through 5E together depict some exemplary embodiments of multilayer reinforcements in accordance with the disclosure, in perspective or cross-sectional views.
Figure 5B:
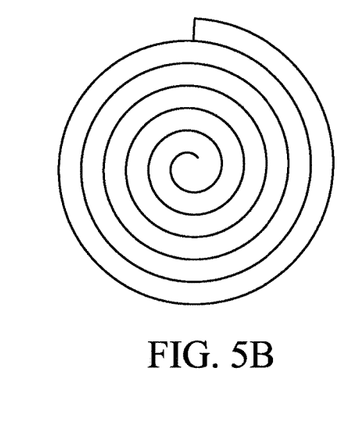
Figure 5C:
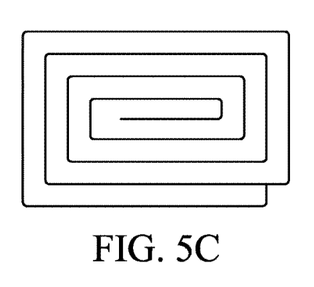
Figure 5D:
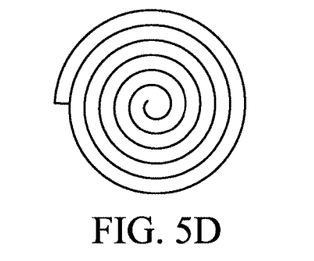
Figure 5E:
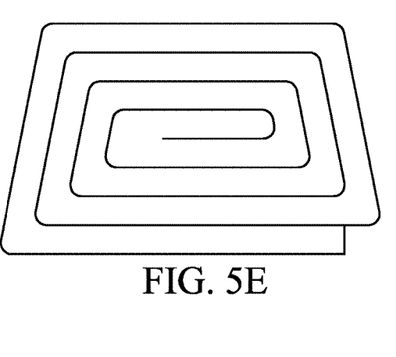

With reference to FIGS. 5A through 5E, which together depict some exemplary embodiments of multilayer reinforcements in accordance with the disclosure, in perspective and cross-sectional views. FIG. 5A illustrates how a sheet 502, which may be first formed, is then wound up into a roll or bundle, 504, which defines one or more 360-degree turns. Prior to winding up, sheet 502 is prepared and includes at least two structural components, which are material matrix 320, and strength reinforcing material 506 entrained within matrix 320. When winding up, sheet 502 may be formed into a roll or bundle having any suitable cross-sectional shape, such as circular (as shown in FIG. B), rectangular (FIG. 5C), ovate rectangular (FIG. 5D), trapezoidal (FIG. 5E), and the like. When disposed within a guide-drive lug, notwithstanding the cross-section shape, the roll or bundle (synonymous terms as used herein) provide at least one 360-degree turns of reinforcing material within the guide-drive lug, as depicted in FIGS. 5B through 5E. Specifically, FIGS. 5B and 5D show five 360-degree turns, and FIGS. 5C and 5E show three 360-degree turns each.

Figure 6:
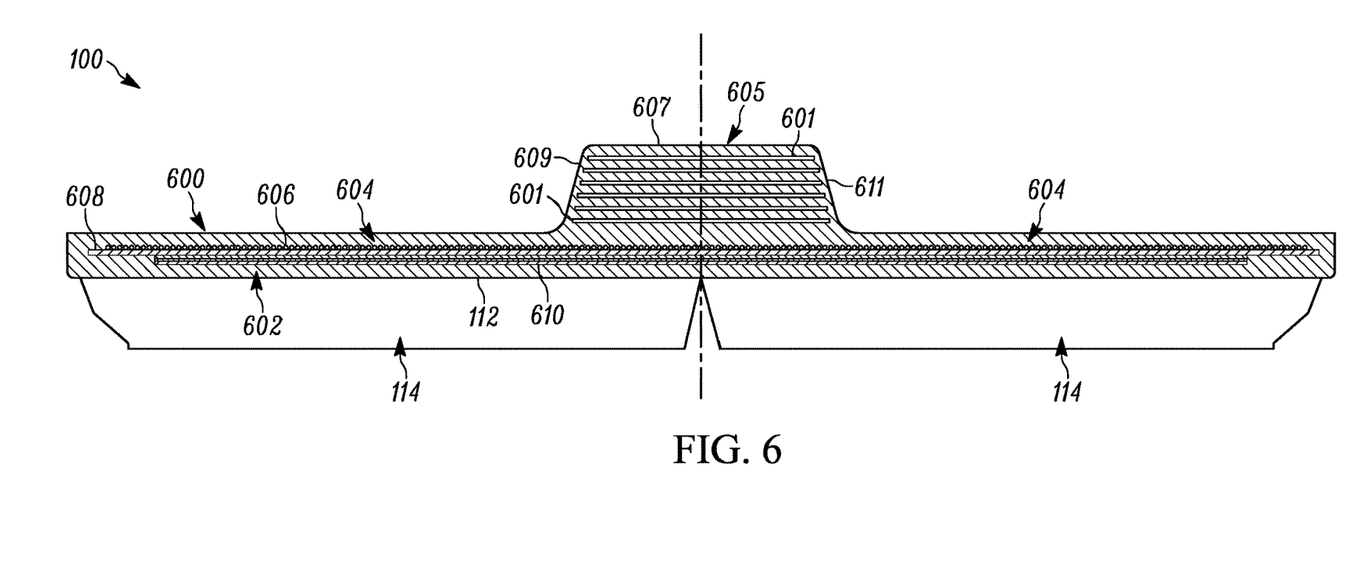
FIG. 6 shows a transverse cross-sectional view of a track assembly in accordance with an embodiment of the disclosure.

Now referring to FIG. 6, which depicts a transverse cross-sectional view of a track assembly, such as track assembly 100 depicted in FIG. 1, the belt carcass 600 typically includes one or more layers of gum rubber or elastomeric material 602. Embedded within the gum rubber or elastomeric material 602 are one or more reinforcement layers 604 which extend transversely along the track width. The reinforcement layers 604 may include such components as longitudinal cable reinforcement layers 606, fabric reinforcement layers 608, transverse cable reinforcement layers 610 (disposed at right angles to the longitudinal direction) or any other reinforcement layer known to those skilled in the art. The guide-drive lugs 605, as shown in FIG. 6 may be formed of natural rubber or synthetic rubber, such as emulsion styrene-butadiene rubber, solution styrene-butadiene rubber, synthetic polyisoprene rubber, polybutadiene rubber, or a blend of natural and synthetic rubbers, or any of other different materials described above. Multilayer reinforcement 601 is embedded within guide-drive lug 605, and having seven layers as depicted. The layers are a contiguous bundle running in a direction same as the longitudinal direction of the belt, which are laid around an axis, which is transverse, as depicted in greater detail below in FIG. 8.

Figure 7A:
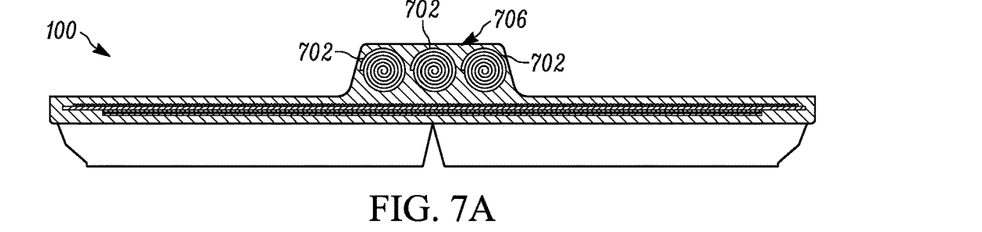
FIGS. 7A though 7E depict some alternate orientations of multilayer reinforcements in accordance with the disclosure, in cross-sectional views; and, FIG. 8 illustrates a longitudinal cross-sectional view of a track assembly in accordance with an embodiment of the disclosure.
Figure 7B:
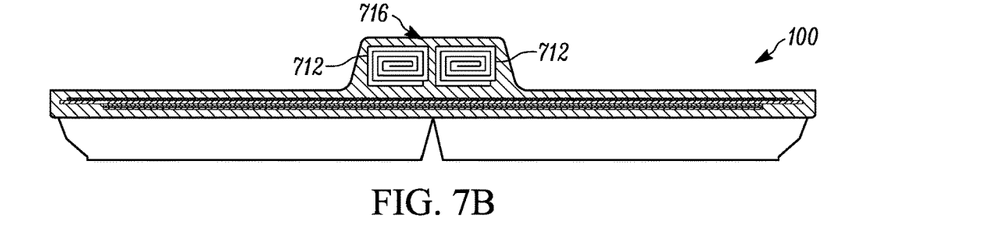
Figure 7C:
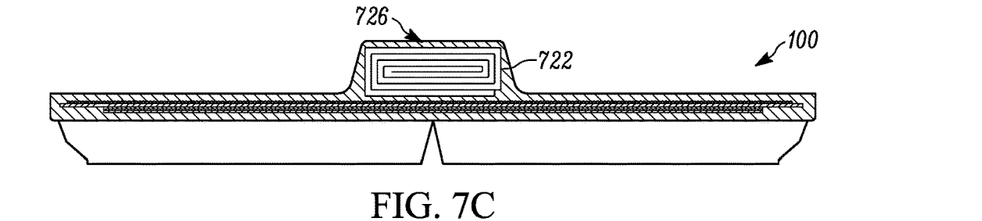

While FIG. 6 shows multilayer reinforcement 302 embedded within guide-drive lug 605, and running in a direction same as the longitudinal direction of the belt, any other effective orientation of multilayer reinforcement 601 within guide-drive lug 605 may be used. FIGS. 7A though 7E depict some alternate orientations. For example, in FIGS. 7A through 7C, which are transverse cross-sectional views of track assembly 100 as is the case in FIG. 6, multilayer reinforcements 702, 712, 726, may be laid upon axes, which are parallel to the longitudinal direction of track 100. In such orientations, the contiguous bundle layers are run in a direction transverse to the longitudinal direction of belt 100. FIG. 7A shows a plurality of circular cross-sectional shaped multilayer reinforcements 702 disposed in guide-drive lug 706, three in this case. FIG. 7B depicts a plurality of rectangular cross-sectional shaped multilayer reinforcements 712 disposed in guide-drive lug 716, two in this case, while FIG. 7C shows a wider rectangular cross-sectional shaped multilayer reinforcement 722 disposed in guide-drive lug 726. These examples are non-limiting, as use of any suitable number, suitable shape, or combinations of shapes, whether disclosed herein, or otherwise readily known to those of skill in the art, is within the spirit and scope of the disclosure. Also, while perpendicular or parallel orientations are depicted in the embodiments described, orientation of contiguous bundle layers at any suitable bias angle, or angles, relative the longitudinal direction of the track, is within the scope of the disclosure.

Figure 7D:
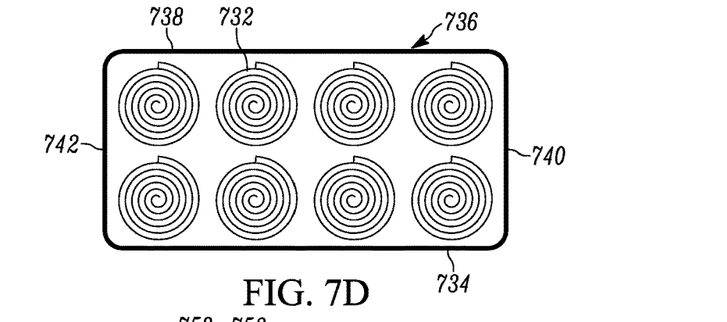
Figure 7E:
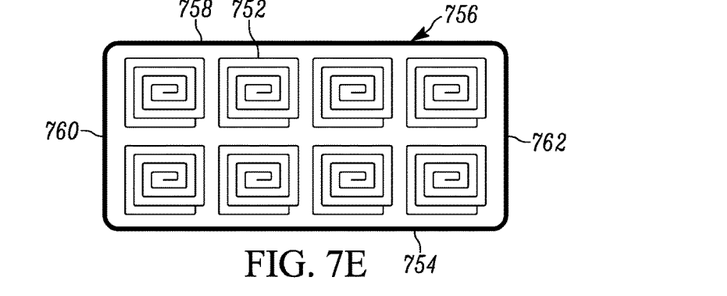

Now referencing FIGS. 7D and 7E, which illustrate yet other alternate orientations of multilayer reinforcement 732, 752, disposed within guide-drive lugs 736, 756. FIGS. 7D and 7E are cross-sectional illustrations of lugs 736, 756, with multilayer reinforcements 732, 752, contained therein, the cross-section made in a plane parallel with upper flat face of lugs 736, 756. Eight multilayer reinforcements 732, 752, are depicted in each of FIGS. 7D and 7E, although any suitable number may be used. The layers of the multilayer reinforcements 732, 752, are disposed about axes, which are transverse to the longitudinal direction of belt 100, as well as transverse to a plane defined, by upper flat face of lugs 736, 756. In FIG. 7D, circular cross-sectional shaped multilayer reinforcements are depicted, while FIG. 7E shows rectangular cross-sectional shaped multilayer reinforcements. These examples are non-limiting as well, and use of any suitable shape, or combinations of shapes, are within the scope of the disclosure.

Figure 8:
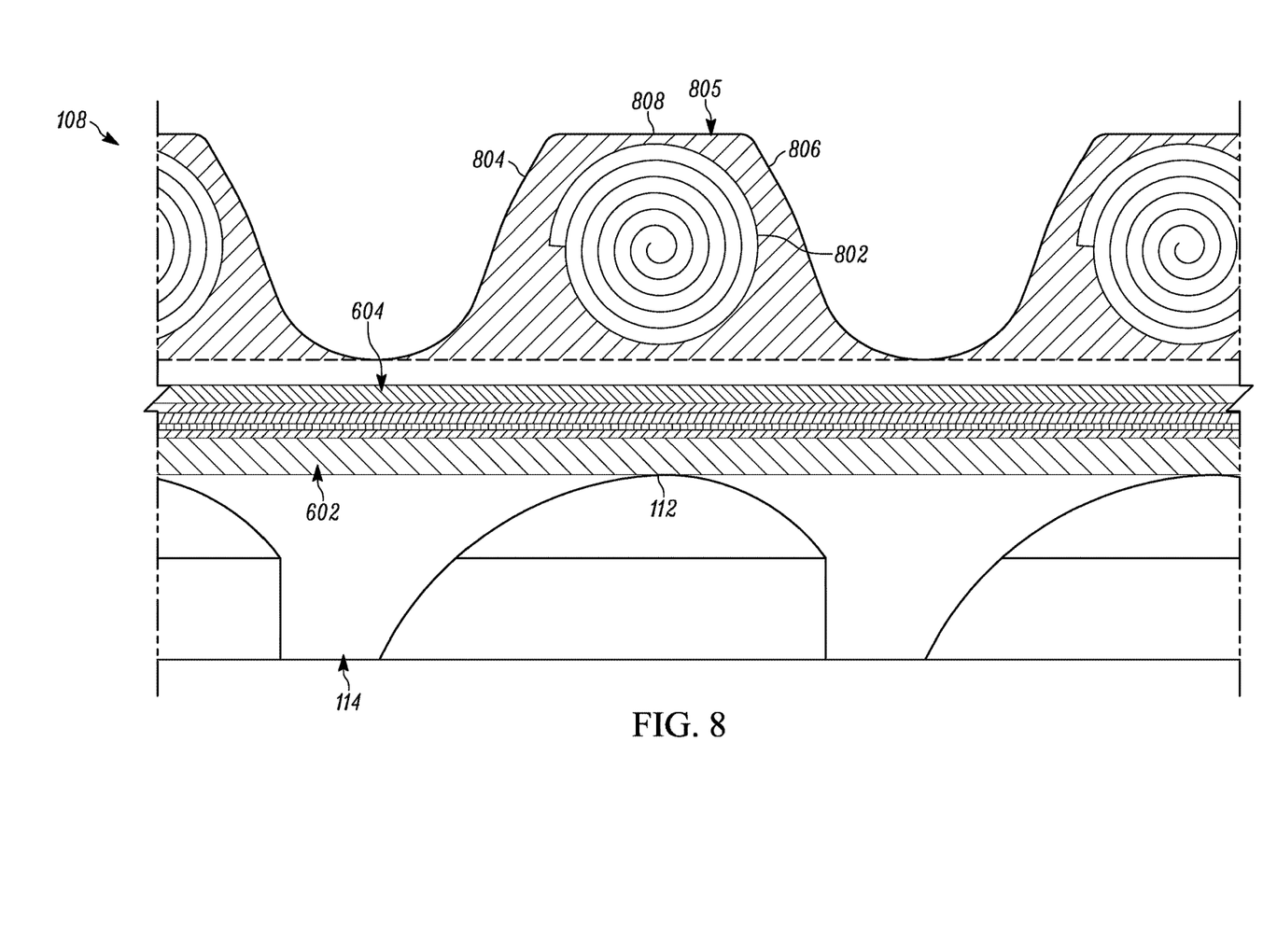

FIG. 8 depicts a portion the embodiment illustrated in FIG. 6; however in FIG. 8, the cross-sectional view is taken along the longitudinal direction of the track assembly. As depicted in FIGS. 6 and 8, rubber track 108 includes lugs 805 having multilayer reinforcements 802 disposed within inclined guide-drive faces 804, 806, and upper flat face 808. Layers in each of the multilayer reinforcements 802 of are a contiguous bundle running in a direction same as the longitudinal direction of the belt, and are laid around axes transverse to the longitudinal direction. As depicted in FIG. 8, multilayer reinforcement 802 provides a plurality of 360-degree turns of material, and specifically, five 360-degree turns are shown.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. An endless vehicle track comprising:
a body formed of an elastomeric material having an outer surface displaying a series of ground engaging profiles longitudinally spaced along the outer surface and an inner surface displaying a series of longitudinally spaced guide-drive lugs for retaining the track on a vehicle and/or driving the vehicle;
a base and an outer surface disposed upon an upper face of each of the guide-drive lugs;
a given width and height defined by each of the guide-drive lugs; and,
a multilayer reinforcement disposed within each of the guide-drive lugs at a distance inward from the outer surface, wherein the multilayer reinforcement is provided in a form of a roll in a single length repeatedly layered upon itself thus providing a plurality of layers of reinforcement material, wherein the multilayer reinforcement defines an axis orientated transverse a longitudinal direction of the endless vehicle track, and wherein the multilayer reinforcement has a finite length; and,
wherein the endless vehicle track comprises more than two guide-drive lugs, each containing a multilayer reinforcement, and wherein the multilayer reinforcement contained in one lug is not in contact with the multilayer reinforcement contained in any other lug.

2. The endless vehicle track of claim 1 wherein the multilayer reinforcement does not extend continuously and longitudinally between different lugs on the track.

3. The endless vehicle track of claim 1 wherein the multilayer reinforcement has a transverse width that is less than or equal to the width of the guide-drive lugs.

4. The endless vehicle track of claim 1 wherein the multilayer reinforcement extends into the lugs from the base of the lugs.

5. The endless vehicle track of claim 1 wherein the multilayer reinforcement extends into the lugs from a first point that is at least 0.08 inch from the base of the lugs.

6. The endless vehicle track of claim 5 wherein the multilayer reinforcement is embedded within the lugs at a minimum distance of 0.08 inch from the outer surface of the upper face of the guide-drive lugs.

7. The endless vehicle track of claim 1 wherein the multilayer reinforcement extends into the lugs from a first point that is at least 0.25 inch from the base of the lugs, and wherein the multilayer reinforcement is embedded within the lugs at a minimum distance of 0.25 inch from the outer surface of the upper face of the guide-drive lugs.

8. The endless vehicle track of claim 1 which is further comprised of an outer fabric reinforcement layer that extends over the lugs at or near the outer surface of at least one guide-drive face of the lugs.

9. The endless vehicle track of claim 8 wherein the outer fabric reinforcement layer extends over the lugs at or near the outer surface of at least one guide-drive face of the lugs and further extends over the lugs at or near the outer surface of at least a portion of the upper face of the lugs.

10. The endless vehicle track of claim 1 wherein the roll of a single length repeatedly layered upon itself provides at least one 360-degree turn of reinforcement material.

11. The endless vehicle track of claim 1 which is further comprised of a second multilayer reinforcement which is embedded in the guide-drive lugs.

12. The endless vehicle track of claim 1 wherein the reinforcing material is entrained within a matrix material.

13. The endless vehicle track of claim 1 wherein the multilayer reinforcement is a roll having an axial cross-sectional shape selected from one of circular, rectangular, square, ovate and trapezoidal.

14. The endless vehicle track of claim 1 wherein the multilayer reinforcement is a roll having an axial cross-sectional shape, and wherein the axis of the shape is orientated transverse to the longitudinal direction of the outer surface of the body.

15. A track comprising:
a body formed of an elastomeric material having a series of longitudinally spaced guide-drive lugs;
a base and an outer surface disposed upon an upper face of each of the guide-drive lugs; and,
a multilayer reinforcement disposed within each of the guide-drive lugs at a distance inward from the outer surface, wherein the multilayer reinforcement is provided in a form of a roll of a single length repeatedly layered upon itself providing a plurality of 360-degree turns of reinforcement material, wherein the roll has an axial cross-sectional shape selected from one of circular, rectangular, square, ovate and trapezoidal, wherein the multilayer reinforcement defines an axis orientated transverse a longitudinal direction of the endless vehicle track, and wherein the multilayer reinforcement has a finite length; and,
wherein the endless vehicle track comprises more than two guide-drive lugs, each containing a multilayer reinforcement, and wherein the multilayer reinforcement contained in one lug is not in contact with the multilayer reinforcement contained in any other lug.

16. A track comprising:
a body formed of an elastomeric material having a series of longitudinally spaced guide-drive lugs;
a base and an outer surface disposed upon an upper face of each of the guide-drive lugs; and,
a multilayer reinforcement disposed within each of the guide-drive lugs at a distance inward from the outer surface, wherein the multilayer reinforcement is provided in a form of a roll of a single length repeatedly layered upon itself providing at least one 360-degree turn of reinforcement material, wherein the roll defines an axial cross-sectional shape, wherein the axis of the shape is orientated transverse to the longitudinal direction of the outer surface of the body or parallel to the longitudinal direction of the outer surface of the body, and wherein the multilayer reinforcement has a finite length; and,
wherein the endless vehicle track comprises more than two guide-drive lugs, each containing a multilayer reinforcement, and wherein the multilayer reinforcement contained in one lug is not in contact with the multilayer reinforcement contained in any other lug.

* * * * *